United States Patent
Moxley

(10) Patent No.: US 11,645,399 B1
(45) Date of Patent: May 9, 2023

(54) SEARCHING ENCRYPTED DATA

(71) Applicant: American Express Travel Related Services Company, Inc., New York, NY (US)

(72) Inventor: John Orlando Keleshian Moxley, Brighton (GB)

(73) Assignee: American Express Travel Related Services Company, INC., New York, NY (US)

( * ) Notice: Subject to any disclaimer, the term of this patent is extended or adjusted under 35 U.S.C. 154(b) by 116 days.

(21) Appl. No.: 17/146,108

(22) Filed: Jan. 11, 2021

(51) Int. Cl.
  *G06F 21/60* (2013.01)
  *H04L 9/06* (2006.01)
  *H04L 9/08* (2006.01)
  *G06F 16/245* (2019.01)

(52) U.S. Cl.
  CPC .......... *G06F 21/602* (2013.01); *G06F 16/245* (2019.01); *H04L 9/0618* (2013.01); *H04L 9/0825* (2013.01); *H04L 9/0861* (2013.01)

(58) Field of Classification Search
  CPC ... G06F 21/602; G06F 16/245; H04L 9/0618; H04L 9/0825; H04L 9/0861
  See application file for complete search history.

(56) References Cited

U.S. PATENT DOCUMENTS

| | | | |
|---|---|---|---|
| 10,511,445 B1 * | 12/2019 | Rubin | H04L 9/3247 |
| 11,177,955 B2 * | 11/2021 | Jacobs | H04L 9/3073 |
| 2010/0114964 A1 * | 5/2010 | Kerschbaum | H04L 9/3234 |
| | | | 713/153 |
| 2016/0330180 A1 * | 11/2016 | Egorov | G09C 1/00 |
| 2018/0054301 A1 * | 2/2018 | El-Alfy | H04L 9/0662 |
| 2019/0018961 A1 * | 1/2019 | Kostyushko | H04L 9/002 |
| 2020/0210482 A1 * | 7/2020 | Becker | G06F 16/9024 |
| 2021/0232568 A1 * | 7/2021 | Yoon | G06F 16/2379 |

* cited by examiner

*Primary Examiner* — J. Brant Murphy
(74) *Attorney, Agent, or Firm* — Thomas | Horstemeyer, LLP

(57) ABSTRACT

Disclosed are various embodiments for searching encrypted data. A search query containing a plaintext key can be received from a client device or other application. A request can then be sent to a storage engine for a ciphertext key of a node of a binary tree, the node representing an encrypted key-value pair that includes the ciphertext key. The ciphertext key can be decrypted using a cryptographic key to generate a decrypted ciphertext key. Then, the decrypted ciphertext key can be compared to the plaintext key. A determination can then be made as to whether the encrypted key-value pair represented by the node of the binary tree satisfies the search query based at least in part on a comparison of the decrypted ciphertext key to the plaintext key.

20 Claims, 8 Drawing Sheets

SEARCHING ENCRYPTED DATA

BACKGROUND

Data is often stored in encrypted form when at rest. This can be done to protect the data from accidental or unintended disclosure to unauthorized parties. However, encrypted data is often difficult to search because the encryption obfuscates the content of the data. Moreover, the use of cryptographic salts can obfuscate the encrypted data even further by ensuring the a given plaintext will result in a different ciphertext each time the plaintext is encrypted. Accordingly, searching encrypted data often requires that the entire dataset be decrypted prior to searching and then reencrypted once the search is completed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
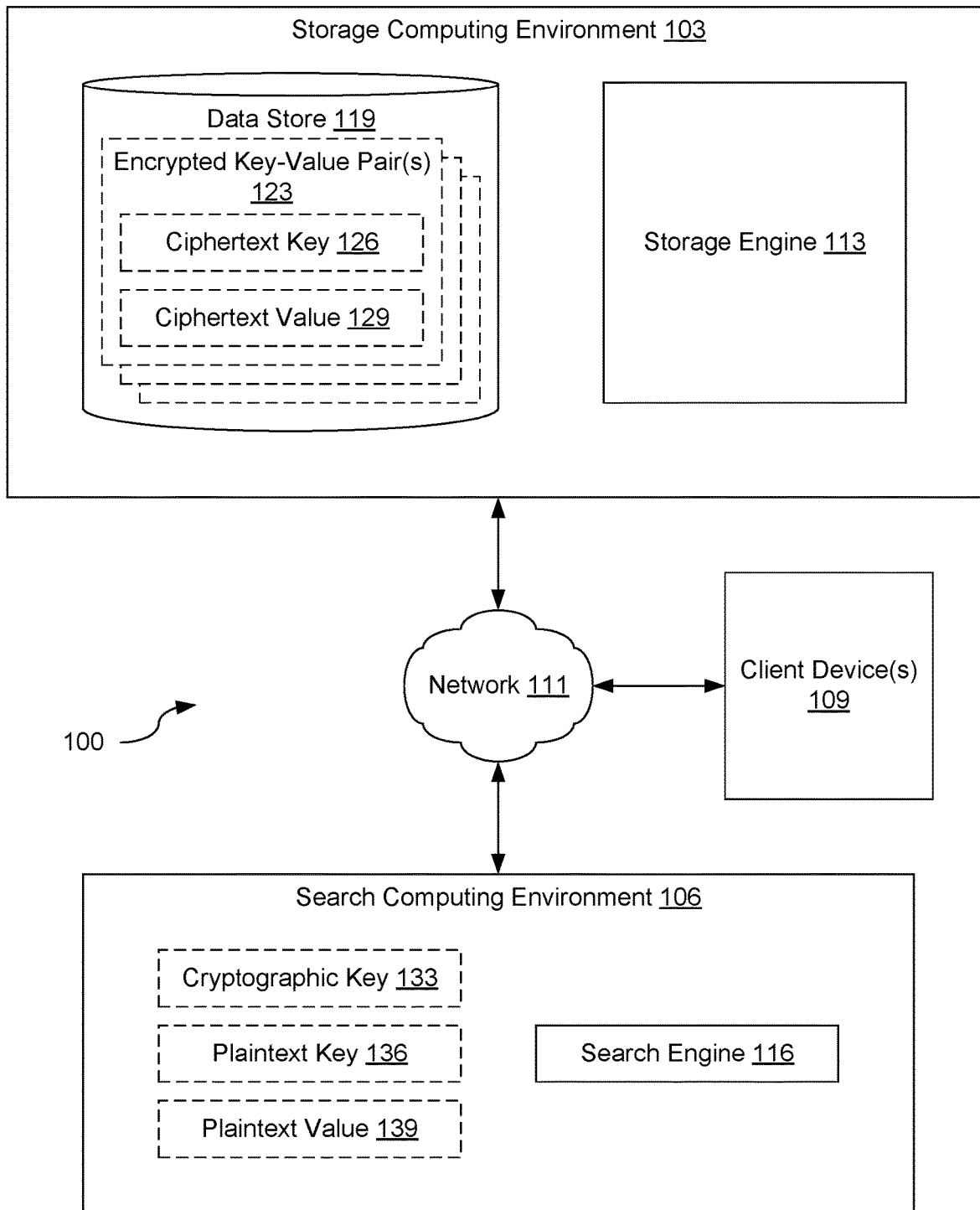
FIG. 1 is a drawing of a network environment according to various embodiments of the present disclosure.

Searching encrypted data presents a number of problems. First, each time the encrypted data is decrypted, it exposes the decrypted data to accident or unintentional disclosure or theft. Second, decrypting and reencrypting entire data sets can be a time-consuming and resource-intensive process. Moreover, storing data in unencrypted form can allow the storage host to read the data stored by its systems.

Accordingly, the present disclosure encompasses various approaches for searching encrypted data without disclosing the contents of the encrypted data to the storage host or provider that stores the encrypted data. Data can be stored in an encrypted format, such as encrypted key-value pairs. Each instance of encrypted data, such as individual encrypted key-value pairs, can be stored in a respective node of a binary tree maintained by the storage host or provider. A search engine can request individual nodes of the binary tree from the storage host or provider and decrypt them for evaluation. The search engine can then request the next node in the binary tree from the storage host or provider for evaluation, until the node containing the encrypted data is identified.

As a result, data can be stored in encrypted form with a third-party or untrusted storage host or provider, such as a cloud computing provider that provides storage solutions or capacity to customers, without disclosing the contents of the encrypted data to the third-party or untrusted storage host provider during a search. Moreover, the use of a binary tree data structure allows for quick and efficient searching of encrypted data records within large sets of encrypted data. Accordingly, data can be both stored and searched in an efficient manner while in encrypted form and in the possession of a third-party.

These embodiments can be useful in a number of contexts. For example, a financial services company (e.g., a bank) may wish to store customer records on third-party storage systems provided by various cloud-computing providers. This could be done to reduce storage costs compared to the financial services company storing the customer records on its own systems. However, the financial services company could require that any data stored on the third-party systems be encrypted in order to prevent unauthorized disclosure of customer data to the third-party or by the third-party to others (e.g., unauthorized disclosure as a result of a data breach). While encrypting the data would prevent its disclosure to unauthorized parties, the encryption also often prevents the financial services company from searching its own data while it is stored on the third-party systems without decrypting and exposing the data to the third-party (e.g., by decrypting and storing the data on the third-party systems). However, various embodiments of the present disclosure would allow the financial services company to search its data while it is stored on the third-party system without decrypting and exposing it to the third-party.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

FIG. 1 depicts a network environment 100 according to various embodiments. The network environment 100 can include a storage computing environment 103, a search computing environment 106, and one or more client devices 109. The storage computing environment 103 can represent a collection of one or more computing devices that are utilized for storing data and providing the stored data in response to requests for the stored data. The search computing environment 106 can represent a collection of one or more computing devices that are utilized for receiving search queries and searching data managed by the storage computing environment 103, as well as encrypting and adding new records or data to the data currently stored by the storage computing environment 103. The storage computing environment 103, the search computing environment 106, and the client device(s) 109 can be in data communication with each other via a network 111.

The network 111 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 111 can also include a combination of two or more networks 111. Examples of networks 111 can include the Internet, intranets, extranets, virtual private networks (VPNs), and similar networks.

The storage computing environment 103 and the search computing environment 106 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the storage computing environment 103 and the search computing environment 106 can employ a plurality of computing devices that can be arranged in one or more server banks or computer banks or other arrangements. Such computing devices can be located in a single installation or can be distributed among many different geographical locations. For example, the storage computing environment 103 and the search computing environment 106 can include a plurality of computing devices that together can include a hosted computing resource, a grid computing resource or any other distributed computing arrangement. In some cases, the storage computing environment 103 and the search computing environment 106 can correspond to an elastic computing resource where the allotted capacity of processing, network, storage, or other computing-related resources can vary over time.

Although depicted separately for purposes of clarity, the storage computing environment 103 and the search computing environment 106 could be part of the same computing environment 103. For example, the storage computing environment 103 and the search computing environment 106 could represent separate computing environments operated by separate entities. However, the applications and data stores hosted by the storage computing environment 103 and the search computing environment 106 could be hosted by the same computing environment. This could happen, for example, when all of the depicted components are owned or operated by the same entity. This could also happen when separate entities that operate the depicted applications and data stores have their applications and data stores hosted by the same provider (e.g., the same cloud computing provider, same data center provider, etc.).

Various applications or other functionality can be executed by the storage computing environment 203 and/or the search computing environment 106. These applications can include a storage engine 113, a search engine 116, and other applications, services, processes, systems, engines, or functionality not discussed in detail herein.

Also, various data can be stored in a data store 119 that is accessible to the storage computing environment 103. The data store 119 can be representative of a plurality of data stores 119, which can include relational databases or non-relational databases such as object-oriented databases, hierarchical databases, hash tables or similar key-value data stores, data structures (e.g., linked lists, heaps, trees, b-trees, binary trees, arrays, etc.), as well as other data storage applications or data structures. Moreover, combinations of these databases, data storage applications, and/or data structures can be used together to provide a single, logical, data store. The data stored in the data store 119 is associated with the operation of the various applications or functional entities described below. This data can include one or more encrypted key-value pairs 123, and potentially other data. The encrypted key-value pairs 123 can be stored in a binary tree data structure maintained by the storage engine 113 according to some embodiments of the present disclosure.

The storage engine 113 can be executed to manage data stored in the data store 119 hosted by the storage computing environment 103. Accordingly, the storage engine 113 can be configured to receive requests for data from the search engine 116, identify data stored in the data store 119 that satisfies the request from the search engine 116, and provide the data in response. The storage engine 113 can also be configured to add, insert, update, replace, or delete data from the data store 119 in response to a respective request or instruction received from the search engine 116.

The search engine 116 can be executed to receive search queries for data stored in the data store 119. Accordingly, the search engine 116 can send a request to the storage engine 113 for individual encrypted key-value pairs 123. The search engine 116 can evaluate the individual encrypted key-value pairs 123 to determine whether one or more of the encrypted key-value pairs 123 satisfy the search query. If the encrypted key-value pair 123 fails to satisfy the search query, the search engine 116 can request additional encrypted key-value pairs 123 for evaluation.

For example, in response to the search engine 116 receiving a search query from a client device 109 or another application hosted in the storage computing environment 203 and/or the search computing environment 106, the search engine 116 could request from the storage engine 113 a root node of the binary tree that stores the individual encrypted key-value pairs 123. If the encrypted key-value pair 123 fails to match the parameters of the search query, then the search engine 116 could request a second node in the binary tree representing a second encrypted key-value pair 123, and evaluate whether the second encrypted key-value pair 123 matches the parameters of the search query. The search engine 116 could continue to request from the storage engine 113 additional nodes of the binary tree until an encrypted key-value pair 123 is identified that satisfies the search query, if any.

The search engine 116 can also be executed to insert data into the data store 119 in cooperation with the storage engine 113. For example, the search engine 116 could traverse the binary tree used to store the encrypted key-value pairs 123. Once the search engine 116 identifies where in the binary tree new data should be inserted, the search engine 116 can create a new encrypted key-value pair 123. The search engine 116 can then provide the new encrypted key-value pair 123 to the storage engine 113 and a position in the binary tree where the storage engine 113 should insert the new encrypted key-value pair 123. In response, the storage engine 113 can insert the new encrypted key-value pair 123 at the specified location.

An encrypted key-value pair 123 can represent a key-value pair stored in encrypted form in the data store 119 by the storage engine 113. The encrypted key-value pair 123 can include both a ciphertext key 126 and a ciphertext value 129. While stored in encrypted form in the data store 119, applications hosted by the storage computing environment (e.g., the storage engine 113) are unable to view the data in unencrypted form.

The ciphertext key 126 can represent an encrypted version of a key for an encrypted key-value pair 123. The ciphertext key 126 can be generated by the search engine 116 using a cryptographic key 133 from a plaintext key 136. The ciphertext key 126 can also be decrypted by the search engine 116 using the cryptographic key 133 when the search engine 116 is implementing a search of the encrypted key-value pairs 123.

The ciphertext value 129 can represent data that is stored in the encrypted key-value pair 123 and indexed by the ciphertext key 126. The ciphertext value 129 can be generated by the search engine 116 using a cryptographic key 133 from a plaintext value 139. The ciphertext value 129 can also be decrypted by the search engine 116 using the cryptographic key 133 when the search engine 116 is implementing a search of the encrypted key-value pairs 123.

The cryptographic key 133 can be stored in the search computing environment 106 and available to the search engine 116. The cryptographic key 133 can be a symmetric cryptographic key, or an asymmetric cryptographic key comprising a public key used for encrypting data and a respective private key used for decrypting data encrypted with the public key. The cryptographic key 133 can be stored in a secure section of memory provided by the search computing environment 106 to ensure that unauthorized applications or users are unable to access the cryptographic key 133. Examples of such secure sections of memory include trusted platform modules (TPM), secure enclaves encrypted by a central processor unit (CPU) (e.g., memory encrypted using INTEL® Software Guard Extension), cryptographic coprocessors, etc.

In addition, both a plaintext key 136 and a plaintext value 136 can be stored in the search computing environment 106 and made available to the search engine 116. The plaintext key 136 can represent an unencrypted version of a ciphertext key 126 for a respective encrypted key-value pair 123. Likewise, the plaintext value 139 can represent an unencrypted version of a ciphertext value 129 for a respective encrypted key-value pair 123.

The client device 109 is representative of a plurality of client devices that can be coupled to the network 111. The client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 109 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 109 or can be connected to the client device 109 through a wired or wireless connection.

The client device 109 can be configured to execute various applications. These applications can be executed by a client device 109 to access network content served up by the search computing environment 106 or other servers, thereby rendering a user interface on the display, such as search results in response to a search query submitted to the search engine 116. To this end, the client device 109 can execute a browser, a dedicated application, or other executable, and the user interface can include a network page, an application screen, or other user mechanism for obtaining user input.

Next, a general description of the operation of the various components of the network environment 100 is provided. Although the following description provides one example of the operation of and interaction between the various components of the network environment 100, it is understood that the various components can interact with each other in additional ways. A more detailed description of the operation of the individual components of the network environment 100 is provided in the paragraphs that accompany the description of FIGS. 2-5C.

To begin, the search engine 116 can receive a search query, which can contain a plaintext key 136 representing a plaintext value 139 to be searched. In response, the search engine 116 can recursively send requests to the storage engine 113 for nodes of a binary tree maintained by the storage engine 113 in the data store 119, wherein individual nodes represent encrypted key-value pairs 123 stored by the storage engine 113 in the data store 119. Each time the search engine 116 requests the encrypted key-value pair 123 of a node in the binary tree, it can decrypt the ciphertext key 126 with the cryptographic key 133 to determine if it matches the plaintext key 136. If a match a occurs, the search engine 116 can request and decrypt the ciphertext value 129 of the encrypted key-value pair 123 represented by the node and return the resulting value plaintext value 139 in response to the search query. However, if there is not a match, the search engine 116 can request a subsequent ciphertext key 126 of the encrypted key-value pair 123 represented by the next node to be traversed in the binary tree.

In addition, the search engine 116 can instruct the storage engine 113 to insert additional records into the data store 119, such as additional encrypted key-value pairs 123 in the binary tree maintained by the storage engine 113. For example, the search engine 116 could receive a plaintext key 136 and a plaintext value 139 to be inserted as an encrypted key-value pair 123 into the binary tree maintained by the storage engine 113 in the data store 119. Accordingly, the search engine 116 could traverse the binary tree maintained by the storage engine 113 by repeatedly requesting ciphertext keys 126 of encrypted key-value pairs 123 from the storage engine 113. Once the storage engine 113 reports to the search engine 116 that there is not a node representing the requested ciphertext key 126 of an encrypted key-value pair 123, the search engine 116 can determine that the new encrypted key-value pair 123 should be inserted at that location in the binary tree maintained by the storage engine 113. The search engine 116 could then encrypt the plaintext key 136 and the plaintext value 139 to generate a respective ciphertext key 126 and ciphertext value 129. The respective ciphertext key 126 and ciphertext value 129 could then be provided to the storage engine 113 for insertion as an encrypted key-value pair 123 represented by a node in the binary tree as the location identified by the search engine 116.

Figure 2A:
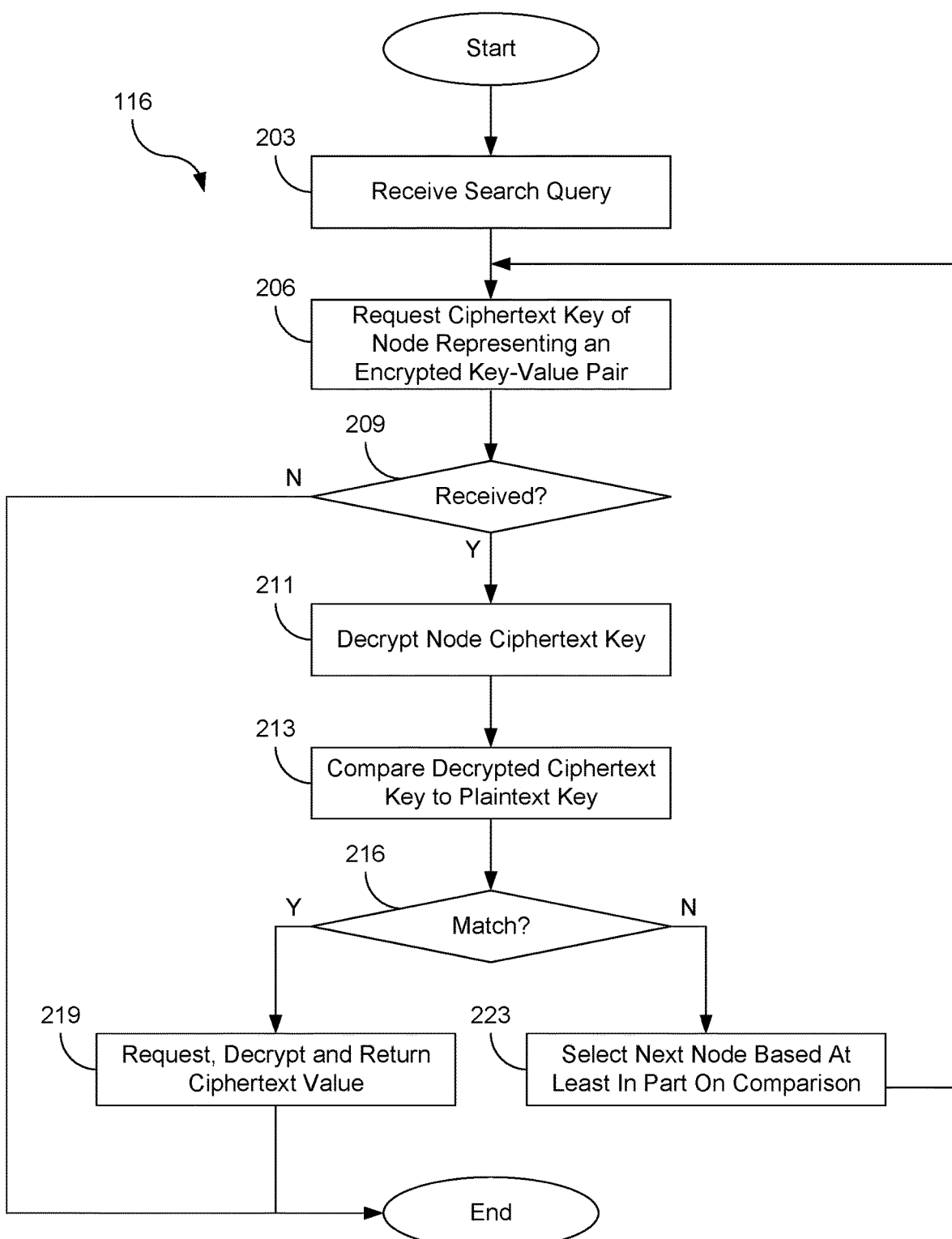
FIG. 2A is a flowchart illustrating one example of functionality implemented as portions of an application executed in a computing environment in the network environment of FIG. 1 according to various embodiments of the present disclosure.

Referring next to FIG. 2A, shown is a flowchart that provides one example of the operation of a portion of the search engine 116 as implements a search of encrypted key-value pairs 123 stored in the data store 119. The flowchart of FIG. 2A provides merely an example of the many different types of functional arrangements that can be employed to implement the operation of the depicted portion of the search engine 116. As an alternative, the flowchart of FIG. 2A can be viewed as depicting an example of elements of a method implemented within the network environment 100.

Beginning with block 203, the search engine 116 can receive a search query. The search query can include a plaintext key 136 to be searched. The search query could be received from a variety of sources. For example, the search query could be received from a client application executing on the client device 109. As another example, the search query could be received from another application hosted by the search computing environment 106.

Then at block 206, the search engine 116 can send a request to the storage engine 113 for a ciphertext key 126 of an encrypted key-value pair 123 represented by a node in a binary tree maintained by the storage engine 113. If this is a first request for a ciphertext key 126, then the request can be for the ciphertext key 126 of encrypted key-value pair 123 represented by the root node of the binary tree. If this is a subsequent request for a ciphertext key 126, then the request can be for a node specified or selected at block 223, as discussed later.

Proceeding to block 209, the search engine 116 can receive the ciphertext key 126 requested at block 206. Assuming the ciphertext key 126 is received from the storage engine 113, then the process can continue to block 211. However, if a ciphertext key 126 is not received from the storage engine 113, this can indicate that the search is complete and no encrypted key-value pairs 123 exist that match or satisfy the search query received at block 203. If this occurs in response to the first request sent by the search engine 116 to the storage engine 113, this could indicate that there are no encrypted key-value pairs 123 stored in the data store 119. If this occurs in response to a subsequent request sent by the search engine 116, such as a request for a node specified or selected at block 223, as discussed later, then this could indicate that the binary tree maintained by the storage engine 113 contains no encrypted key-value pairs 123 that satisfy the search query received at block 203.

Next at block 211, the search engine 116 can decrypt the ciphertext key 126 received at block 209 using the cryptographic key 133 to generate a decrypted ciphertext key 126. If the cryptographic key 133 is a symmetric cryptographic key 133, then the cryptographic key 133 itself can be used to decrypt the ciphertext key 133. If the cryptographic key 133 is an asymmetric cryptographic key 133, then the private key could be used to decrypt the ciphertext key 126.

Moving on to block 213, the search engine 116 can compare the decrypted ciphertext key 126 to the plaintext key 136 and, at block 216, the search engine 116 can determine whether the decrypted ciphertext key 126 matches the plaintext key 136. If the decrypted ciphertext key 126 matches the plaintext key 136, this can indicate that the respective encrypted key-value pair 123 satisfies the search query received at block 203. The process would then proceed to block 219. However, if the decrypted ciphertext key 126 fails to match the plaintext key 136, then the process could proceed to block 223.

If the process proceeds to block 219, the search engine 116 can create or generate a response to the search query received at block 203. This can be done several ways. First, the search engine 116 can send a request to the storage engine 113 for the ciphertext value 129 of the respective encrypted key-value pair 123 for the ciphertext key 126. Once the search engine 116 receives the ciphertext value 129 from the storage engine 113 in response to the request, the search engine 116 can return the ciphertext value 129 in response to the search query received at block 203. Once the ciphertext value 129 is returned in response, the process can end. Alternatively, once the search engine 116 receives the ciphertext value 129 from the storage engine 113 in response to the request, the search engine 116 can decrypt the ciphertext value 129 using the cryptographic key 133 to generate a decrypted ciphertext value 129. The search engine 119 can then return the decrypted ciphertext value 129 to the device or application that submitted the search query at block 203. After the decrypted ciphertext value 129 is provided in response, the process can end.

However, if the process proceeds to block 223, the search engine 116 can continue to search for an encrypted key-value pair 123 that would satisfy the search query received at block 203 by selecting the next node in the binary tree to request from the storage engine 113. For example, if the comparison at block 213 indicated that the plaintext key 136 in the search query were less than the value of the decrypted ciphertext key 126, then the search engine 116 could determine that the location of a matching encrypted key-value pair 123 should be represented by a node that descends from the left or "less-than" side of the current node in the binary tree. The search engine 116 could then return to block 206 to request the next node that descends from the left or "less-than" side of the current node in the binary tree from the storage engine 113. Likewise, if the comparison at block 213 indicated that the plaintext key 136 in the search query were greater than the value of the decrypted ciphertext key 126, then the search engine 116 could determine that the location of a matching encrypted key-value pair 123 should be represented by a node that descends from the right or "great-than" side of the current node in the binary tree. The search engine 116 could then return to block 206 to request the next node that descends from the right or "greater-than" side of the current node in the binary tree from the storage engine 113.

Figure 2B:
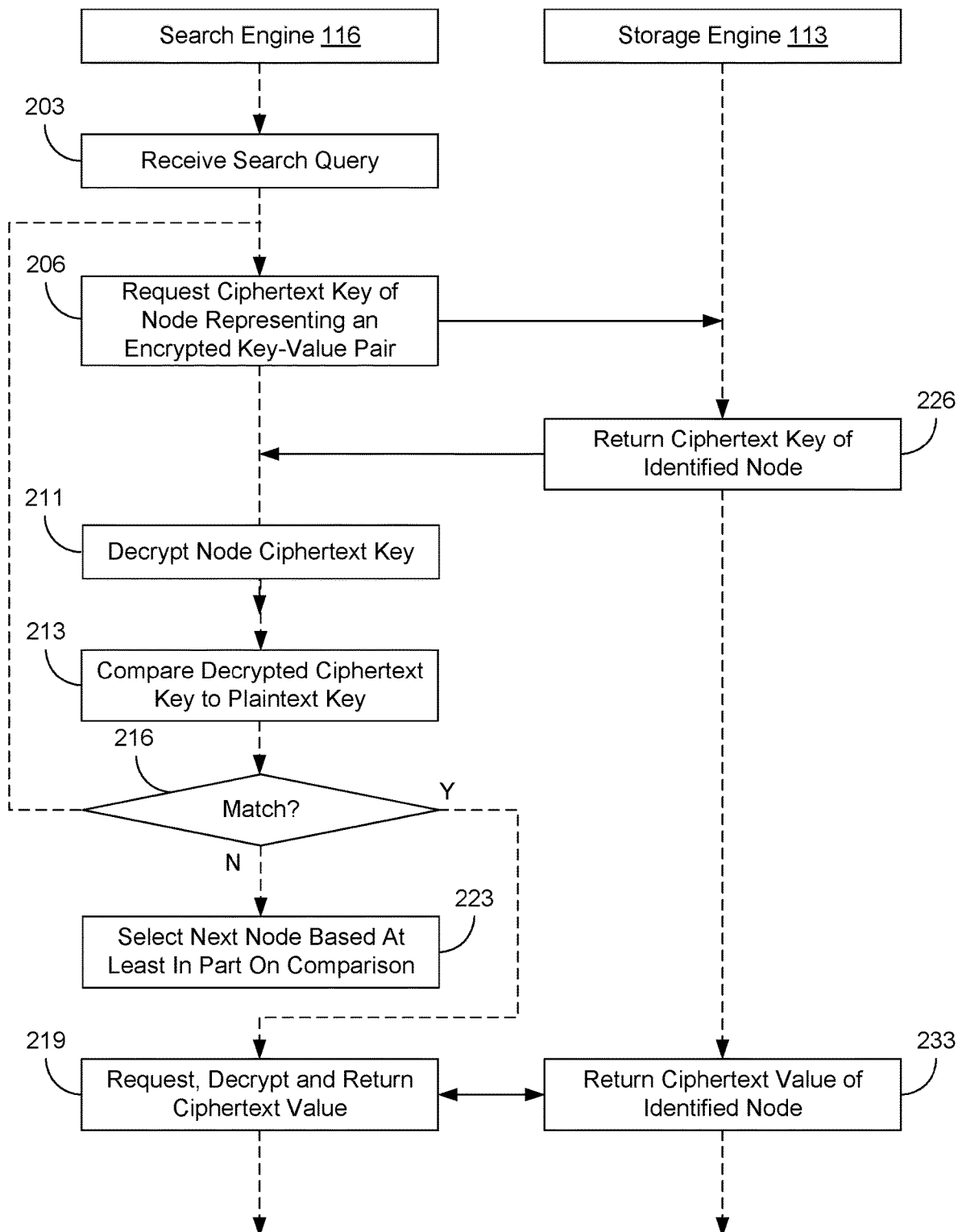
FIG. 2B is a sequence diagram illustrating one example of the interactions between the components of the network environment of FIG. 1 according to various embodiments of the present disclosure.

FIG. 2B is a sequence diagram illustrating the interaction of the search engine 116, as depicted and described in the flowchart of FIG. 2A, with the storage engine 113. The sequence diagram of FIG. 2B provides merely an example of the many different types of functional arrangements that can be employed to implement the operation of the depicted portions of the search engine 116 and storage engine 113. As an alternative, the sequence diagram of FIG. 2B can be viewed as depicting an example of elements of a method implemented within the network environment 100.

At block 203, the search engine 116 can receive a search query as previously discussed with respect to FIG. 2A. Then at block 206, the search engine 116 can send a request to the storage engine 113 for a ciphertext key 126 of an encrypted key-value pair 123 represented by a node in a binary tree maintained by the storage engine 113, as previously discussed with respect to FIG. 2A.

Next at block 226, the storage engine 113 the storage engine 113 can access the requested node of the binary tree maintained by the storage engine 113 and return the ciphertext key 126 to the search engine 116.

Returning back to block 211, the search engine 116 can compare the decrypted ciphertext key 126 to the plaintext key 136, and, at block 216, the search engine 116 can determine whether the decrypted ciphertext key 126 matches the plaintext key 136. If the decrypted ciphertext key 126 matches the plaintext key 136, this can indicate that the respective encrypted key-value pair 123 satisfies the search query received at block 203. The process would then proceed to block 219, where the search engine 116 could create or generate a response to the search query received at block 203 as previously described in the discussion of FIG. 2A. Accordingly, the search engine 116 could, at block 219, sent a request to the storage engine 113 for the ciphertext value 129 stored in the node of the binary tree associated with the ciphertext key 126. The storage engine 113 could query the node and return the ciphertext value 129 to the search engine 116 in response. However, if the decrypted ciphertext key 126 fails to match the plaintext key 136, then the process could proceed to block 223, where the search engine 116 could continue to search for an encrypted key-value pair 123 that would satisfy the search query received at block 203 by selecting the next node in the binary tree to request from the storage engine 113, as previously described in the discussion of FIG. 2A.

Figure 3A:
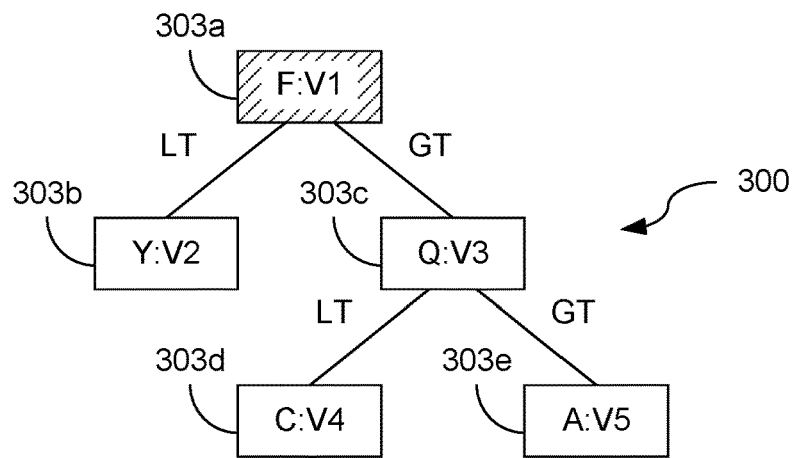
FIGS. 3A-3F are a graphical depiction of the process described by the flowchart of FIG. 2 according to various embodiments of the present disclosure.
Figure 3B:
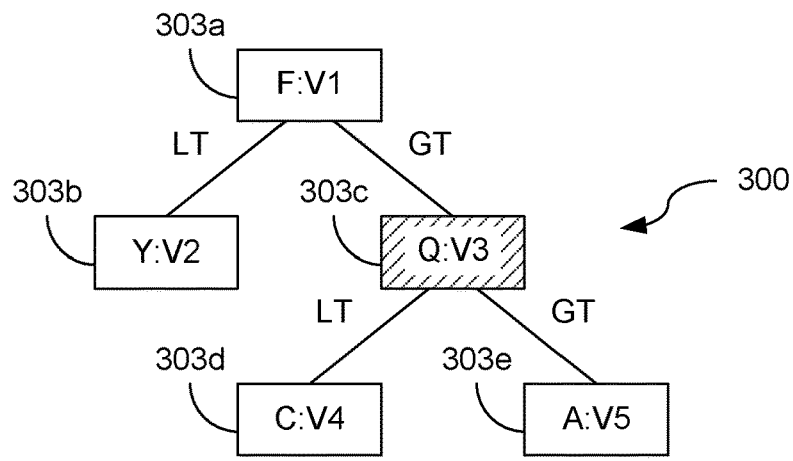
Figure 3C:
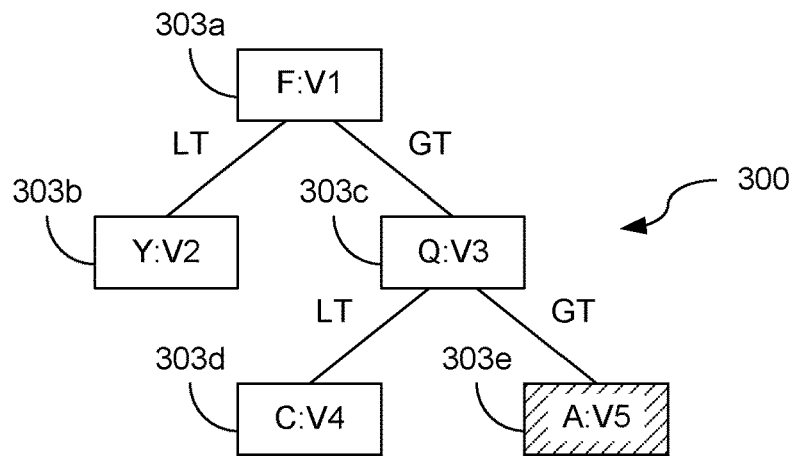

FIGS. 3A-3F provide a graphical depiction of a search of a binary tree 300 using a process such as the process depicted in FIG. 2A and FIG. 2B. As shown in FIGS. 3A-3C, the binary tree 300 includes nodes 303a, 303b, 303c, 303d, and 303e (collectively "nodes 303" or generically "node 303"). Each node represents an encrypted key-value pair 123 that comprises a ciphertext key 126 and a ciphertext value 129. For illustrative purposes, Table 1 below lists the encrypted and decrypted values for the encrypted key-value pairs 123 represented by the nodes 303.

TABLE 1

| Ciphertext Key 126 | Decrypted Ciphertext Key |
|---|---|
| A | 9975586342 |
| C | 6112334896 |
| F | 5088248342 |
| Q | 8122399834 |
| Y | 4113335477 |

As shown in FIG. 3A, the search engine 116 can request an encrypted key-value pair 123 represented by node 303a, which is the root node in the binary tree 300. The encrypted key-value pair 123 represented by node 303a has a ciphertext key 126 "F" which, when decrypted, has a value of 5088248342. Assuming that the search engine 116 is searching for an encrypted key-value pair 123 with a ciphertext key 126 that has a decrypted value of 9975586342, the search engine 116 could conclude that the node 303 that contains a matching encrypted key-value pair 123 would reside within the branch of nodes 303 that have ciphertext keys 126 with decrypted values greater than 5088248342, such as nodes 303c, 303d, and 303e. Accordingly, the search engine 116 could request node 303c from the storage engine 113.

Proceeding to FIG. 3B, the search engine 116 has requested an encrypted key-value pair 123 represented by node 303c, which is the node that contains a ciphertext key 126 with a decrypted value greater than the ciphertext key 126 of node 303a. The encrypted key-value pair 123 represented by node 303c has a ciphertext key 126 "Q" which, when decrypted, has a value of 8122399834. Assuming that the search engine 116 is searching for an encrypted key-value pair 123 with a ciphertext key 126 that has a decrypted value of 9975586342, the search engine 116 could conclude that the node 303 that contains a matching encrypted key-value pair 123 would reside within the branch of nodes 303 that have ciphertext keys 126 with decrypted values greater than 8122399834, such as node 303e. Accordingly, the search engine 116 could request node 303e from the storage engine 113.

Finally, as depicted in FIG. 3C, the search engine 116 has requested an encrypted key-value pair 123 represented by node 303e, which is the node that contains a ciphertext key 126 with a decrypted value greater than the ciphertext key 126 of node 303c. The encrypted key-value pair 123 represented by node 303e has a ciphertext key 126 "A" which, when decrypted, has a value of 9975586342. Because the decrypted value of the ciphertext key 126 for the encrypted key-value pair 123 represented by node 303e matches the value for which the search engine 116 is searching, the search engine 116 can conclude that the encrypted key-value pair 123 represented by node 303e satisfies the parameters of the search query. The search engine 116 could accordingly request ciphertext value 129 "V5" from the storage engine 113, decrypt the ciphertext value 129 "V5" once received, and return the decrypted ciphertext value 129 for "V5" in response to the search query.

Partial searches can also be supported by creating an encrypted key-value pair 123 that has a ciphertext key 126 and multiple ciphertext values 129 and storing the encrypted key-value pair 123 in the binary tree 300. For example, if one wished to be able to search for any encrypted key-value pair 123 with a ciphertext key 126 that ended in "342," such as ciphertext keys 126 "A" and "F" listed in Table 1, one could create an encrypted key-value pair 123 with a ciphertext key 126 with a decrypted value of "342" and multiple ciphertext values 129, such as V1 and V2. A node 303 representing the encrypted key-value pair 123 with the ciphertext key 126 with a decrypted value of "342" and the multiple ciphertext values 129, such as V1 and V2, could then be inserted in the binary tree 300. When one does a search for a ciphertext key 126 that decrypts to the value "342," one could traverse the tree to find the appropriate node 303 using the previously described practices.

Figure 3D:
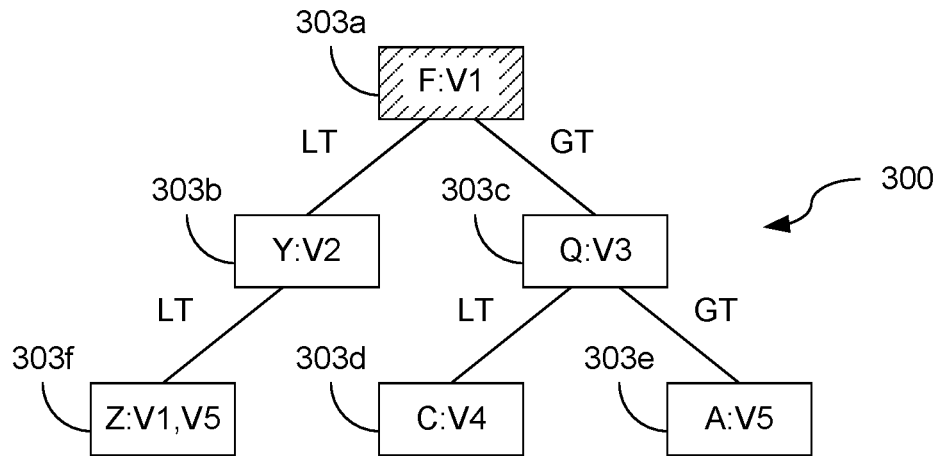

An example of a binary tree 300 that supports partial searching is depicted in FIG. 3D. As shown, the binary tree 300 includes a node 303f that represents an encrypted key-value pair 123 with a ciphertext key 126 "Z" and multiple ciphertext values 129 "V1" and "V5." As shown in Table 2 below, the ciphertext key 126 "Z" represents a decrypted ciphertext key 126 "342," allowing someone to search for all ciphertext values 129 with a respective ciphertext key 126 that ends in "342."

TABLE 2

| Ciphertext Key 126 | Decrypted Ciphertext Key |
|---|---|
| A | 9975586342 |
| C | 6112334896 |
| F | 5088248342 |
| Q | 8122399834 |
| Y | 4113335477 |
| Z | 342 |

Figure 3E:
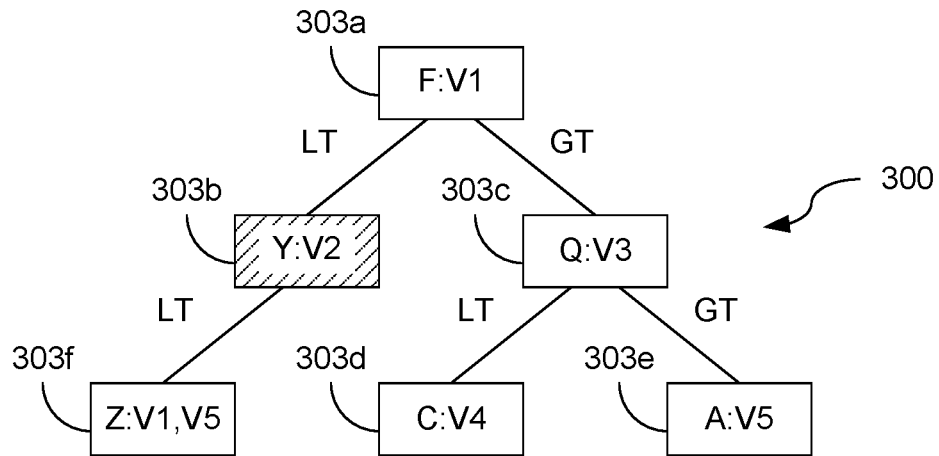
Figure 3F:
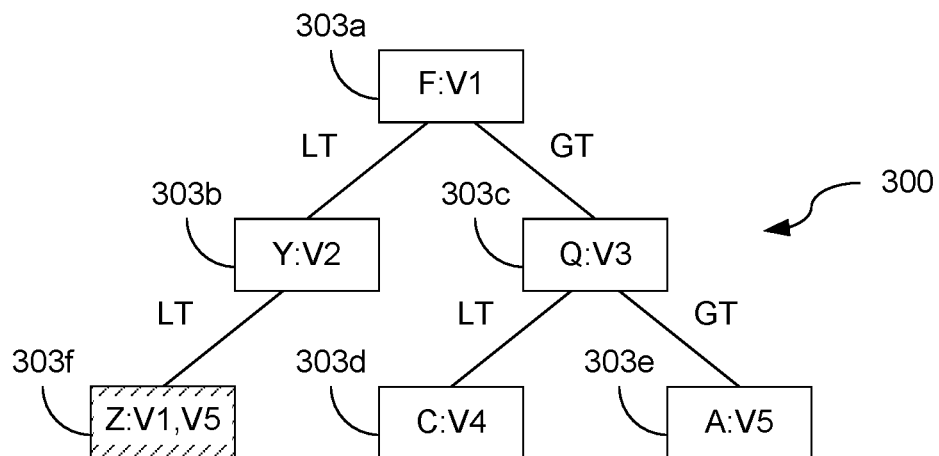

Because the decrypted value for the ciphertext key 126 "Z" is the smallest value of those stored in the binary tree 300, the search engine 116 could traverse the binary tree 300. First, the search engine 116 could move from node 303a to node 303b, as depicted in FIG. 3E. Then, the search engine 116 could move from node 303b to node 303f, which represents the encrypted key-value pair 123 that has the ciphertext key 126 "Z" that the search engine 116 is searching for.

Figure 4A:
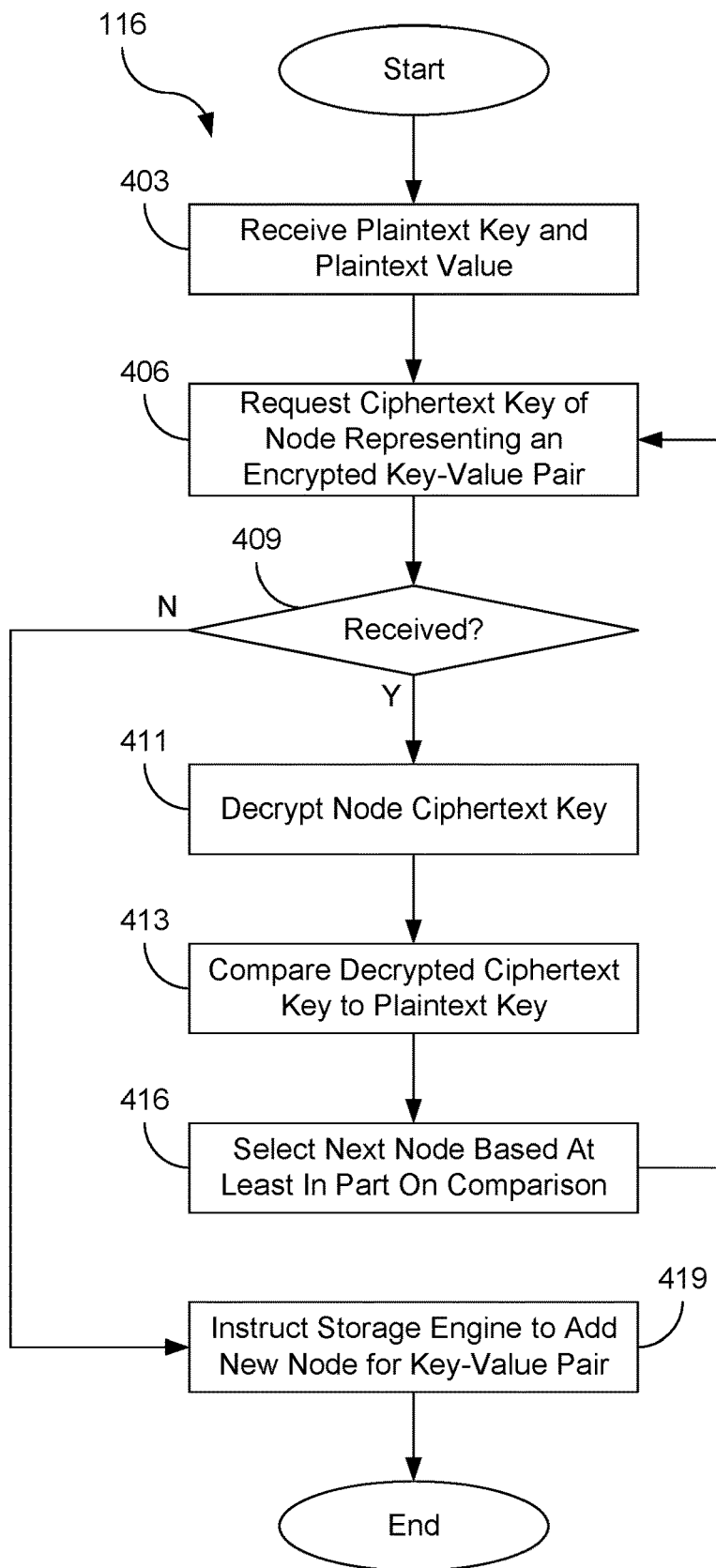
FIG. 4A is a flowchart illustrating one example of functionality implemented as portions of an application executed in a computing environment in the network environment of FIG. 1 according to various embodiments of the present disclosure.

Referring next to FIG. 4A, shown is a flowchart that provides one example of the operation of a portion of the search engine 116 as it causes additional encrypted key-value pairs 123 to be stored in the data store 119. The flowchart of FIG. 4A provides merely an example of the many different types of functional arrangements that can be employed to implement the operation of the depicted portion of the search engine 116. As an alternative, the flowchart of FIG. 4A can be viewed as depicting an example of elements of a method implemented within the network environment 100.

Beginning with block 403, the search engine 116 can receive a plaintext value 139 to be stored in the data store 119 as an encrypted key-value pair 123. In some instances, the search engine 116 could also receive a plaintext key 136 to be used to search for the plaintext value 139. This could occur, for example, if the plaintext value 139 has a unique identifier associated with it (e.g., an account number for a bank or financial institution customer). In other instances, the search engine 116 could generate the plaintext key 136 based at least in part on the plaintext value 139. This could be done, for example, by applying a cryptographic or one-way hash function to the plaintext value 139.

Then at block 406, the search engine 116 can send a request to the storage engine 113 for a ciphertext key 126 of an encrypted key-value pair 123 represented by a node in a binary tree maintained by the storage engine 113. If this is a first request for a ciphertext key 126, then the request can be for the ciphertext key 126 of encrypted key-value pair 123 represented by the root node of the binary tree. If this is a subsequent request for a ciphertext key 126, then the request can be for a node specified or selected at block 416, as discussed later.

Then, at block 409, the search engine 116 can determine whether it has received the requested ciphertext key 126 from the storage engine 113. If the requested ciphertext key 126 is not returned by the storage engine 113, that can indicate that no node representing an encrypted key-value pair 123 exists at that location in the binary tree. Alternatively, the search engine 116 could determine that the response received from the storage engine 113 indicates that no node representing an encrypted key-value pair 123 exists at that location in the binary tree. Accordingly, the search engine 116 can conclude that the plaintext value 139 and the plaintext key 136 from block 403 should be stored as an encrypted key-value pair 123 in a node at that location in the binary tree. In this situation, the process would skip to block 419. However, if a ciphertext key 126 is returned by the storage engine 113, then the search engine 116 can proceed to block 411 in order to continue the search for an appropriate location to insert the plaintext key 136 and plaintext value 139 received at block 403.

Next at block 411, the search engine 116 can decrypt the ciphertext key 126 received in response to the request sent at block 406 using the cryptographic key 133 to generate a decrypted ciphertext key 126. If the cryptographic key 133 is a symmetric cryptographic key 133, then the cryptographic key 133 itself can be used to decrypt the ciphertext key 133. If the cryptographic key 133 is an asymmetric cryptographic key 133, then the private key could be used to decrypt the ciphertext key 126.

Moving on to block 413, the search engine 116 can compare the decrypted ciphertext key 126 to the plaintext key 136 received at block 403. This comparison can be done so that the search engine 116 can determine whether the decrypted ciphertext key 126 is greater than or less than the plaintext key 136. Then, at block 416, the search engine 116 can determine which node representing an encrypted key-value pair 123 should be requested next from the storage engine 113. If the value of the decrypted ciphertext key 126 is less than the plaintext key 136, then the search engine 116 could return to block 406 and request a next node in the binary tree representing an encrypted key-value pair 123 with a decrypted ciphertext key 126 that is greater than the value of the decrypted ciphertext key 126 of the current encrypted key-value pair 123. However, if the value of the decrypted ciphertext key 126 is greater than the plaintext key 136, then the search engine 116 could return to block 406 and request a next node in the binary tree representing an encrypted key-value pair 123 with a decrypted ciphertext key 126 that is less than the value of the decrypted ciphertext key 126 of the current encrypted key-value pair 123.

Once the process proceeds to block 419, the search engine 116 can cause the plaintext value 139 and the plaintext key 136 to be stored in the data store 119 by the storage engine 113. Accordingly, the search engine 116 can encrypt both the plaintext value 139 and the plaintext key 136 with the cryptographic key 133 to generate a respective ciphertext value 129 and ciphertext key 126. The search engine 116 could then create the encrypted key-value pair 123 and provide it to the storage engine 113 for storage in node at the identified location in the binary tree. Alternatively, the search engine 116 could send the respective ciphertext value 129 and ciphertext key 126 to the storage engine 113, and the storage engine 113 would then create the encrypted key-value pair 123 and insert it in a node at the identified location in the binary tree.

Figure 4B:
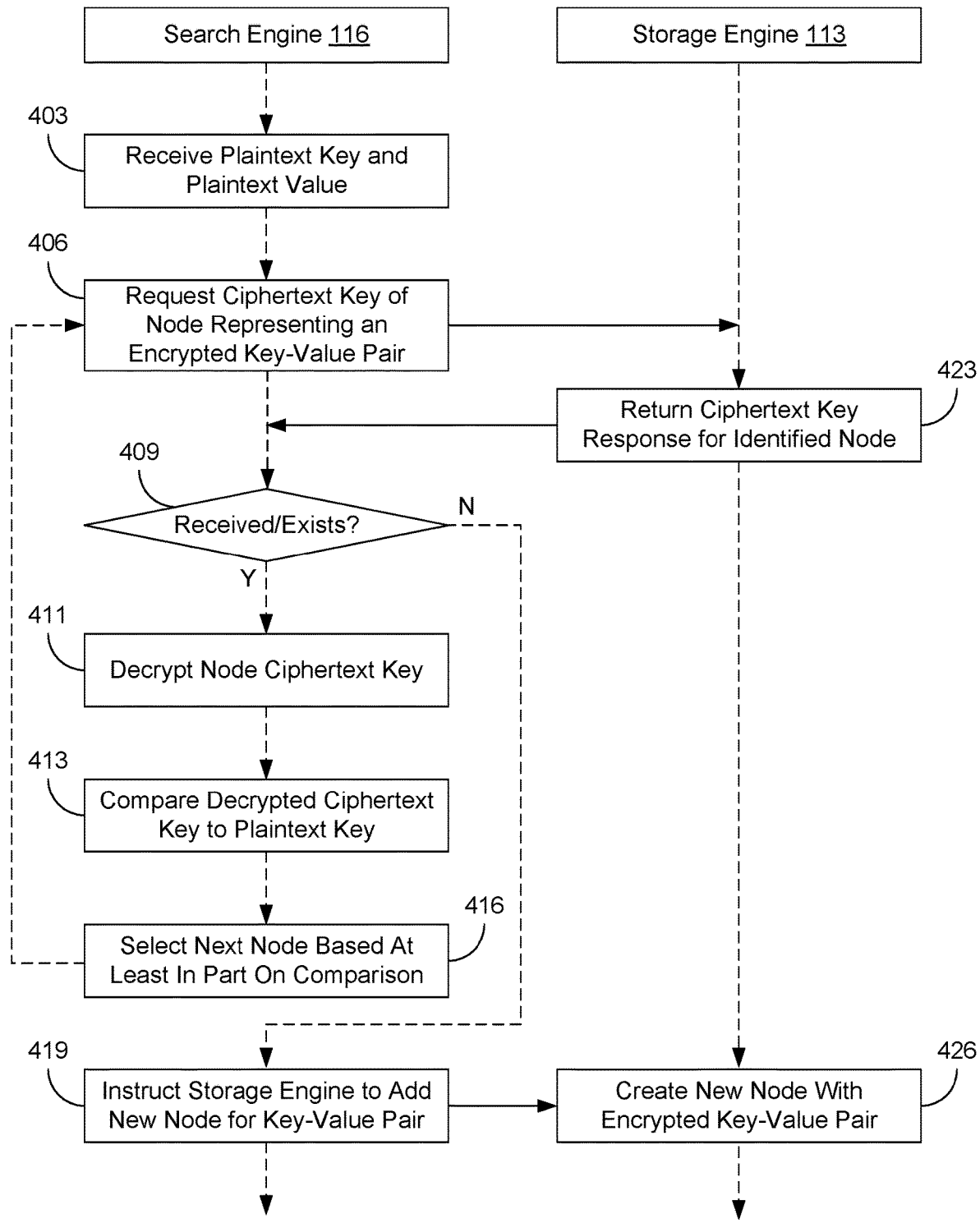
FIG. 4B is a sequence diagram illustrating one example of the interactions between the components of the network environment of FIG. 1 according to various embodiments of the present disclosure.

FIG. 4B is a sequence diagram illustrating the interaction of the search engine 116, as depicted and described in the flowchart of FIG. 4A, with the storage engine 113. The sequence diagram of FIG. 4B provides merely an example of the many different types of functional arrangements that can be employed to implement the operation of the depicted portions of the search engine 116 and storage engine 113. As an alternative, the sequence diagram of FIG. 4B can be viewed as depicting an example of elements of a method implemented within the network environment 100.

Beginning with block 403, the search engine 116 can receive a plaintext value 139 to be stored in the data store 119 as an encrypted key-value pair 123, as previously described in FIG. 4A. Then at block 406, the search engine 116 can send a request to the storage engine 113 for a ciphertext key 126 of an encrypted key-value pair 123 represented by a node in a binary tree maintained by the storage engine 113, as previously described in FIG. 4A.

In response to receiving the request for the ciphertext key 126 of an encrypted key-value pair 123 represented by a node in a binary tree maintained by the storage engine 113, the storage engine 113 can, at block 423, determine whether the requested node exists and, if the node exists, access the node and return the ciphertext key 126 of the encrypted key-value pair 123 represented by the node. Likewise, if the requested node does not exist, which could occur if the encrypted key-value pair 123 were not stored in the binary tree maintained by the storage engine 113, then the storage engine 113 could return a respective response at block 423. For example, if the requested node does not exist, the storage engine 113 could either fail to respond or provide an explicit response that the requested node does not exist.

Then at block 409, the search engine 116 can determine whether it has received the requested ciphertext key 126 from the storage engine 113. If the requested ciphertext key 126 is not returned by the storage engine 113, that can indicate that no node representing an encrypted key-value pair 123 exists at that location in the binary tree. Alternatively, the search engine 116 could determine that the response received from the storage engine 113 indicates that no node representing an encrypted key-value pair 123 exists at that location in the binary tree. Accordingly, the search engine 116 can conclude that the plaintext value 139 and the plaintext key 136 from block 403 should be stored as an encrypted key-value pair 123 in a node at that location in the binary tree. In this situation, the process would skip to block 419. However, if a ciphertext key 126 is returned by the storage engine 113, then the search engine 116 can proceed to block 411 in order to continue the search for an appropriate location to insert the plaintext key 136 and plaintext value 139 received at block 403.

If the process proceeds to block 411, the search engine 116 can the search engine 116 can decrypt the ciphertext key 126 received in response to the request sent at block 406 using the cryptographic key 133 to generate a decrypted ciphertext key 126, as previously described in FIG. 4A. Then, at block 413, the search engine 116 can compare the decrypted ciphertext key 126 to the plaintext key 136 received at block 403, as previously described in FIG. 4A. Next, at block 416, the search engine 116 can determine which node representing an encrypted key-value pair 123 should be requested next from the storage engine 113, as previously described in FIG. 4A.

However, if the process skips to block 419, the search engine 116 can cause the plaintext value 139 and the plaintext key 136 to be stored in the data store 119 by the storage engine 113, as previously described in FIG. 4A. Then, at block 426, the storage engine 113 can receive from the search engine 116 the ciphertext key 126 generated from the plaintext key 136 and the ciphertext value 129 generated from the plaintext value 129. The storage engine 113 can store them as an encrypted key-value pair 123 in a node of the binary tree at the location selected by the search engine 116.

Figure 5A:
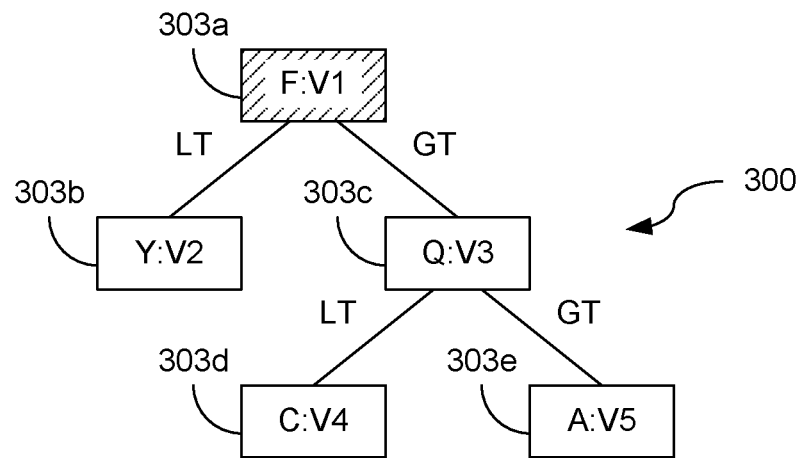
FIGS. 5A-5C are a graphical depiction of the process described by the flowchart of FIG. 4 according to various embodiments of the present disclosure.
Figure 5B:
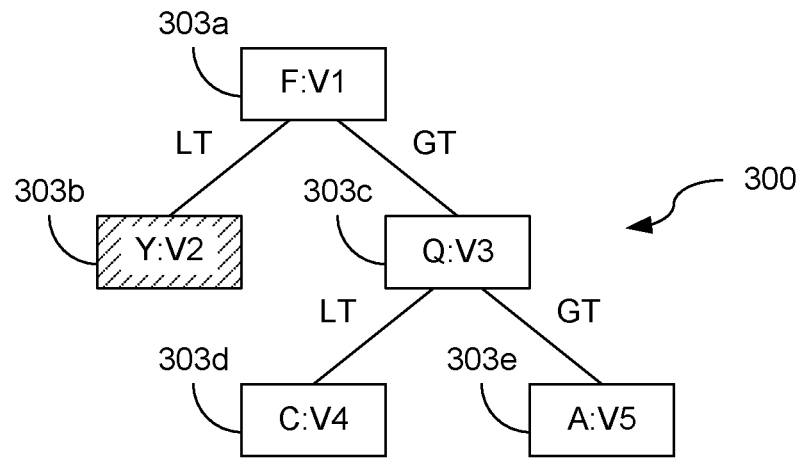
Figure 5C:
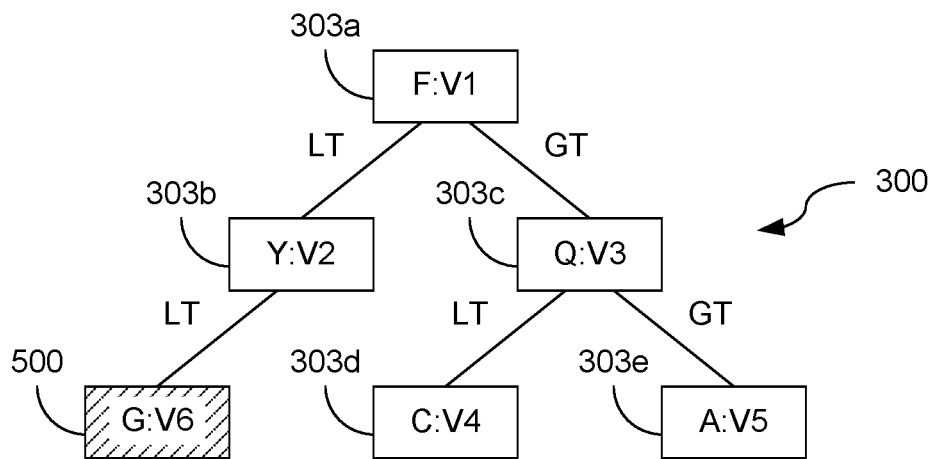

FIGS. 5A-5C provide a graphical depiction of the insertion of a new node 500 representing an encrypted key-value pair 123 into the binary tree 300 using a process such as the process depicted in FIG. 4. As shown in FIGS. 5A-5C, the binary tree 300 includes nodes 303a, 303b, 303c, 303d, and 303e (collectively "nodes 303" or generically "node 303"). Each node represents an encrypted key-value pair 123 that comprises a ciphertext key 126 and a ciphertext value 129. For illustrative purposes, Table 1 below lists the encrypted and decrypted values for the encrypted key-value pairs 123 represented by the nodes 303.

TABLE 1

| Ciphertext Key 126 | Decrypted Ciphertext Key |
|---|---|
| A | 9975586342 |
| C | 6112334896 |
| F | 5088248342 |
| Q | 8122399834 |
| Y | 4113335477 |

To begin, the search engine 116 can receive a request to insert a plaintext value 139 represented by a plaintext key 136 (e.g., a plaintext key 136 with a value of "2421295766"). The search engine 116 can generate an encrypted version of the plaintext value 139, such as ciphertext value 129 "V6." The search engine 116 can also begin to traverse the binary tree 300 to determine where to insert a node 500 representing an encrypted key-value pair 123 that stores the ciphertext value 129 "V6."

As shown in FIG. 5A, the search engine 116 can request an encrypted key-value pair 123 represented by node 303a, which is the root node in the binary tree 300. The encrypted key-value pair 123 represented by node 303a has a ciphertext key 126 "F" which, when decrypted, has a value of 5088248342. The search engine 116 could then compare the decrypted value of "F" with the value of the plaintext key 126 to be inserted (e.g., "2421295766"). Because the value of the plaintext key 126 to be inserted is less than the decrypted value of "F," the search engine 116 can determine that it should request node 303b next because node 303b has a ciphertext key 126 with a decrypted value less than the decrypted value of "F." Accordingly, the search engine 116 could request node 303b from the storage engine 113.

Proceeding to FIG. 3B, the search engine 116 can request an encrypted key-value pair 123 represented by node 303b. The encrypted key-value pair 123 represented by node 303b has a ciphertext key 126 "Y" which, when decrypted, has a value of 4113335477. The search engine 116 could then compare the decrypted value of "Y" with the value of the plaintext key 126 to be inserted (e.g., "2421295766"). Because the value of the plaintext key 126 to be inserted is less than the decrypted value of "Y," the search engine 116 can determine that it should request the next node 303 that represents an encrypted key-value pair 123 with a ciphertext key 126 with a decrypted value less than the decrypted value of "Y."

As illustrated in FIG. 5C, node 303b does not have any child nodes. Accordingly, the search engine 116 can conclude that an encrypted key-value pair 123 with a ciphertext key 126 that represents the plaintext key 136 with a value of 2421295766 and a ciphertext value 129 of "V6" should be inserted as a child node 500 of node 303b. The search engine 116 can then provide the respective ciphertext key 126 and ciphertext value 129 to the storage engine 113, which can insert a node 500 representing the encrypted key-value pair 123 at the identified location.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, and/or Z, or any combination thereof (e.g., X; Y; Z; X and/or Y; X and/or Z; Y and/or Z; X, Y, and/or Z, etc.). Thus, such disjunctive language is not generally intended to, and should not, imply that certain embodiments require at least one of X, at least one of Y, and/or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A computer-implemented method, comprising:
    receiving a search query, the search query comprising a plaintext key;
    sending a request to a storage engine for a ciphertext key of a node of a binary tree, the node representing an encrypted key-value pair that includes the ciphertext key;
    receiving the ciphertext key from the storage engine;
    decrypting the ciphertext key using a cryptographic key to generate a decrypted ciphertext key;

comparing the decrypted ciphertext key to the plaintext key; and determining whether the encrypted key-value pair represented by the node of the binary tree satisfies the search query based at least in part on comparing the decrypted ciphertext key to the plaintext key.

2. The computer-implemented method of claim 1, wherein the request is a first request, the encrypted key-value pair is a first encrypted key-value pair, the ciphertext key is a first ciphertext key, the node of the binary tree is a first node in the binary tree, the decrypted ciphertext key is a first decrypted ciphertext key, and method further comprises:

sending a second request to the storage engine for a second ciphertext key of a second node of the binary tree in response to a determination that the first encrypted key-value pair fails to satisfy the search query based at least in part on the comparison of the first decrypted ciphertext key to the plaintext key, the second node representing a second encrypted key-value pair that includes the second ciphertext key;

decrypting the second ciphertext key using the cryptographic key to generate a second decrypted ciphertext key;

comparing the second decrypted ciphertext key to the plaintext key; and determining whether the second encrypted key-value pair represented by the node of the binary tree satisfies the search query based at least in part on a comparison of the second decrypted ciphertext key to the plaintext key.

3. The computer-implemented method of claim 1, wherein determining whether the encrypted key-value pair represented by the node of the binary tree satisfies the search query based at least in part on a comparison of the decrypted ciphertext key to the plaintext key further comprises determining whether a first value of the decrypted ciphertext key is greater than, less than, or equal to a second value of the plaintext key.

4. The computer-implemented method of claim 1, wherein the method further comprises:

requesting a ciphertext value of the node from the storage engine in response to determining that the encrypted key-value pair represented by the node of the binary tree satisfies the search query;

receiving the ciphertext value of the node from the storage engine;

decrypting the ciphertext value with the cryptographic key to generate a decrypted ciphertext value; and returning the decrypted ciphertext value in response to the search query.

5. The computer-implemented method of claim 1, wherein the cryptographic key comprises a private key of an asymmetric cryptographic key.

6. The computer-implemented method of claim 1, wherein the search query is received from a client device.

7. A system, comprising:

a computing device comprising a processor and a memory;

a cryptographic key stored in the memory; and machine-readable instructions stored in the memory that, when executed by the processor, cause the computing device to at least:

receive a search query, the search query comprising a plaintext key;

send a request to a storage engine for a ciphertext key of a node of a binary tree, the node representing an encrypted key-value pair that includes the ciphertext key;

receive the ciphertext key from the storage engine;

decrypt the ciphertext key using the cryptographic key to generate a decrypted ciphertext key;

compare the decrypted ciphertext key to the plaintext key; and determine whether the encrypted key-value pair represented by the node of the binary tree satisfies the search query based at least in part on a comparison of the decrypted ciphertext key to the plaintext key.

8. The system of claim 7, wherein the request is a first request, the encrypted key-value pair is a first encrypted key-value pair, the ciphertext key is a first ciphertext key, the node of the binary tree is a first node in the binary tree, the decrypted ciphertext key is a first decrypted ciphertext key, and the machine-readable instructions further cause the computing device to at least:

send a second request to the storage engine for a second ciphertext key of a second node of the binary tree in response to a determination that the first encrypted key-value pair fails to satisfy the search query based at least in part on the comparison of the first decrypted ciphertext key to the plaintext key, the second node representing a second encrypted key-value pair that includes the second ciphertext key;

decrypt the second ciphertext key using the cryptographic key to generate a second decrypted ciphertext key;

compare the second decrypted ciphertext key to the plaintext key; and determine whether the second encrypted key-value pair represented by the node of the binary tree satisfies the search query based at least in part on a comparison of the second decrypted ciphertext key to the plaintext key.

9. The system of claim 1, wherein the machine-readable instructions that cause the computing device to determine whether the encrypted key-value pair represented by the node of the binary tree satisfies the search query based at least in part on a comparison of the decrypted ciphertext key to the plaintext key further cause the computing device to determine whether a first value of the decrypted ciphertext key is greater than, less than, or equal to a second value of the plaintext key.

10. The system of claim 7, wherein the machine-readable instructions further cause the computing device to at least:

request a ciphertext value of the node from the storage engine in response to a determination that the encrypted key-value pair represented by the node of the binary tree satisfies the search query;

receive the ciphertext value of the node from the storage engine;

decrypt the ciphertext value with the cryptographic key to generate a decrypted ciphertext value; and return the decrypted ciphertext value in response to the search query.

11. The system of claim 7, wherein the computing device is a first computing device controlled or operated by a first entity, the storage engine is executed on a second, separate computing device in a separate computing environment, the binary tree is maintained by the storage engine, and wherein the storage engine, and the second, separate computing device controlled or operated by a second entity and the binary tree is stored in a data store controlled or operated by the second entity.

12. The system of claim 7, wherein the cryptographic key comprises a private key of an asymmetric cryptographic key.

13. The system of claim 7, wherein the search query is received from a client device.

14. A non-transitory, computer-readable medium, comprising machine-readable instructions that, when executed by a processor of a computing device, cause the computing device to at least:
receive a search query, the search query comprising a plaintext key;
send a request to a storage engine for a ciphertext key of a node of a binary tree, the node representing an encrypted key-value pair that includes the ciphertext key;
receive the ciphertext key from the storage engine;
decrypt the ciphertext key using a cryptographic key stored in a memory of the computing device to generate a decrypted ciphertext key;
compare the decrypted ciphertext key to the plaintext key; and
determine whether the encrypted key-value pair represented by the node of the binary tree satisfies the search query based at least in part on a comparison of the decrypted ciphertext key to the plaintext key.

15. The non-transitory, computer-readable medium of claim 14, wherein the request is a first request, the encrypted key-value pair is a first encrypted key-value pair, the ciphertext key is a first ciphertext key, the node of the binary tree is a first node in the binary tree, the decrypted ciphertext key is a first decrypted ciphertext key, and the machine-readable instructions further cause the computing device to at least:
send a second request to the storage engine for a second ciphertext key of a second node of the binary tree in response to a determination that the first encrypted key-value pair fails to satisfy the search query based at least in part on the comparison of the first decrypted ciphertext key to the plaintext key, the second node representing a second encrypted key-value pair that includes the second ciphertext key;
decrypt the second ciphertext key using the cryptographic key to generate a second decrypted ciphertext key;
compare the second decrypted ciphertext key to the plaintext key; and
determine whether the second encrypted key-value pair represented by the node of the binary tree satisfies the search query based at least in part on a comparison of the second decrypted ciphertext key to the plaintext key.

16. The non-transitory, computer-readable medium of claim 14, wherein the machine-readable instructions that cause the computing device to determine whether the encrypted key-value pair represented by the node of the binary tree satisfies the search query based at least in part on a comparison of the decrypted ciphertext key to the plaintext key further cause the computing device to determine whether a first value of the decrypted ciphertext key is greater than, less than, or equal to a second value of the plaintext key.

17. The non-transitory, computer-readable medium of claim 14, wherein the machine-readable instructions further cause the computing device to at least:
request a ciphertext value of the node from the storage engine in response to a determination that the encrypted key-value pair represented by the node of the binary tree satisfies the search query;
receive the ciphertext value of the node from the storage engine;
decrypt the ciphertext value with the cryptographic key to generate a decrypted ciphertext value; and
return the decrypted ciphertext value in response to the search query.

18. The non-transitory, computer-readable medium of claim 14, wherein the computing device is a first computing device controlled or operated by a first entity, the storage engine is executed on a second, separate computing device in a separate computing environment, the binary tree is maintained by the storage engine, and wherein the storage engine, and the second, separate computing device controlled or operated by a second entity and the binary tree is stored in a data store controlled or operated by the second entity.

19. The non-transitory, computer-readable medium of claim 14, wherein the cryptographic key comprises a private key of an asymmetric cryptographic key.

20. The non-transitory, computer-readable medium of claim 14, wherein the search query is received from a client device.

* * * * *